(12) United States Patent
Mayor et al.

(10) Patent No.: US 7,218,682 B2
(45) Date of Patent: May 15, 2007

(54) METHODS AND APPARATUS FOR SYNCHRONOUSLY COMBINING SIGNALS FROM PLURAL TRANSMITTERS

(75) Inventors: Michael A. Mayor, Fort Wayne, IN (US); Ning Lu, Parsippany, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 744 days.

(21) Appl. No.: 10/073,037

(22) Filed: Feb. 12, 2002

(65) Prior Publication Data
US 2005/0031045 A1  Feb. 10, 2005

(51) Int. Cl.
*H04L 27/04* (2006.01)
(52) U.S. Cl. .................. 375/299; 375/267; 375/356
(58) Field of Classification Search ............ 375/299, 375/267, 347, 256
See application file for complete search history.

(56) References Cited

U.S. PATENT DOCUMENTS

| 5,233,626 | A | * | 8/1993 | Ames ..................... 375/148 |
| 5,369,682 | A | * | 11/1994 | Witsaman et al. ......... 340/7.26 |
| 5,446,924 | A | * | 8/1995 | Christian et al. ............. 455/8 |
| 5,652,748 | A | | 7/1997 | Jolma et al. |
| 6,665,521 | B1 | * | 12/2003 | Gorday et al. .......... 455/67.11 |
| 2001/0043578 | A1 | | 11/2001 | Kumar et al. |

FOREIGN PATENT DOCUMENTS

DE  199 52 900 A1  5/2001
WO  WO 02/09306 A1  1/2002

* cited by examiner

Primary Examiner—Kevin Kim
(74) Attorney, Agent, or Firm—Edell, Shapiro & Finnan, LLC (57) ABSTRACT

Enhanced reception of transmitted signals in a communication system is achieved by synchronously combining transmissions from a cluster of transmitters at a distant receiver. The transmitters coordinate transmissions such that each substantially simultaneously transmits the same signal on the same communication channel. As a consequence of the spatial diversity of the transmitters, the transmitted signals arrive at the receiver at different times. The receiver essentially treats the different transmitted signals as though they were different multipath signals from a single transmitter. A multipath equalizer or combiner is used to determine timing offsets among the received signals, and the received signals are time aligned by phase rotating the signals in accordance with the estimated timing offsets. The time-aligned signals are then coherently combined and detected. The combined signal has a greater signal-to-noise ratio than the individual received signals, permitting detection at a greater range or with a lower bit error rate.

41 Claims, 8 Drawing Sheets

METHODS AND APPARATUS FOR SYNCHRONOUSLY COMBINING SIGNALS FROM PLURAL TRANSMITTERS

BACKGROUND OF THE INVENTION

1. Field of the Invention

The present invention relates to methods and apparatus for enhancing reception of transmitted signals and, more particularly, to techniques for synchronously combining transmissions from plural transmitters at a distant receiver to extend range performance.

2. Description of the Related Art

One factor affecting range performance in wireless communication systems is the power with which signals are transmitted. Generally, the strength of a received signal is proportional to the transmit power and inversely proportional to the square of the range between the transmitter and receiver. At a given transmit power, as the range between a transmitting device and a receiving device increases, the signal strength at the receiving device becomes increasingly attenuated, eventually prohibiting reception. Range performance improves with increasing transmit power; conversely, lower transmit power reduces the maximum range at which transmitted signals can be detected.

Unfortunately, there are a number of circumstances in which transmit power is limited by equipment capabilities, operational requirements or both. For example, with mobile communication devices which rely on battery power supplies, the maximum transmit power may be limited by design to achieve a tradeoff between operating range and battery power consumption. Other equipment cost or performance considerations may dictate transmit power capabilities that limit operational range or limit system performance under harsh operating conditions.

In certain circumstances, a need may exist to minimize RF emissions. In military contexts, particularly in battlefield situations, minimizing transmit power reduces the likelihood of signal detection by hostile parties, thereby preventing the transmitter's position from being compromised. For example, in a situation where a small team of radio-equipped personnel is located within a hostile region and must communicate with a distant device, for any single radio to communicate with the distant device, considerable transmit power would be required, resulting in a significant opportunity for detection by hostile forces. Moreover, the transmit power level required to communicate over significant distances would likely drain the radio's battery more rapidly than desired.

In other contexts, low transmit power levels may be advantageous or required to minimizing interference with other devices, particularly in high bandwidth usage situations, such as with wireless telephony. In general, it would be advantageous in a variety of applications to achieve certain range performance with reduced transmit power levels or, conversely, to increase range performance without increasing transmit power.

Operational parameters other than transmit power can be optimized for better range performance under certain conditions. For example, antenna gain may be increased using a directional antenna, or more sophisticated receiver schemes can be employed. In some cases, the problem of limited range performance (or, equivalently, limited transmit power) may be overcome using repeaters to boost the signal power at an intermediate location between the source transmitter and destination receiver. However, each of these solutions has drawbacks, such as increased size, cost and circuit complexity, overall system complexity, and increased energy requirements. Such solutions are especially disadvantageous in covert military situations where minimizing size and transmit power and maximizing stealth are of utmost importance. Accordingly, it would be highly desirable in power-limited scenarios to enhance range performance without resorting to such solutions.

SUMMARY OF THE INVENTION

Therefore, in light of the above, and for other reasons that become apparent when the invention is fully described, an object of the present invention is to enhance the range performance of a group of communication devices communicating with a distant receiving device, thereby permitting communication over a range greater than that achievable by any single device transmitting at a particular power level.

Another object of the invention is to reduce the transmit power required from any single communication device in order to reduce the probability of signal interception by unintended recipients.

A further object of the invention is to increase the overall signal strength of a transmitted signal at a receiver without having to increase the transmit power from an individual transmitter.

Yet another object of the invention is to coordinate signal transmissions of plural communication devices to effectively send the same signals from plural locations to a common receiver device and thereby improve the detectability of the information in these signals.

Still another object of the invention is to take advantage of collective transmit power of clusters of communication devices to communicate signals with greater effective transmit power than is available from individual devices in the cluster.

The aforesaid objects are achieved individually and in combination, and it is not intended that the present invention be construed as requiring two or more of the objects to be combined unless expressly required by the claims attached hereto.

Enhanced reception of transmitted signals in a digital communication system is achieved by synchronously combining transmissions from a cluster of transmitters at a distant receiver. The transmitters coordinate their transmissions such that each substantially simultaneously transmits the same signal on the same communication channel. As a consequence of the spatial diversity of the transmitters, the transmitted signals arrive at the receiver at different times. The receiver essentially treats the different transmitted signals as though they were different multipath signals from a single transmitter. A multipath equalizer or combiner is used to determine timing offsets among the received signals, and the received signals are time aligned by phase rotating the signals in accordance with the estimated timing offsets. The time-aligned signals are then coherently combined and detected. The combined signal has a greater signal-to-noise ratio than the individual received signals, permitting detection at a greater range or with a lower bit error rate without having to increase the transmit power of any individual transmitter. Consequently, enhanced signal reception and range performance can be achieved in systems where transmit power is limited by operational constraints or equipment limitations.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE INVENTION

The present invention involves a signal combining technique in which signals are transmitted in a coordinated manner from plural communication devices in relatively close proximity to each other (e.g., a "cluster" of devices) to a receiving communication device which coherently combines the signals as if they were different multipath rays of a single transmission. The combined signal power enables reception of signals over ranges far greater than would otherwise be possible with a single device transmitting at the same single-device power level.

The signal combining concept of the present invention uses the collective resources of a number of communication devices by synchronizing or coordinating transmission and reception of signals. Proper coordination enables the cluster of communication devices to collectively transmit the same information-bearing signals, such that an intended receiver can process the received signals to significantly improve the communications performance (e.g. quality of service, range, etc.) with efficient utilization of transmitting energy.

Figure 1:
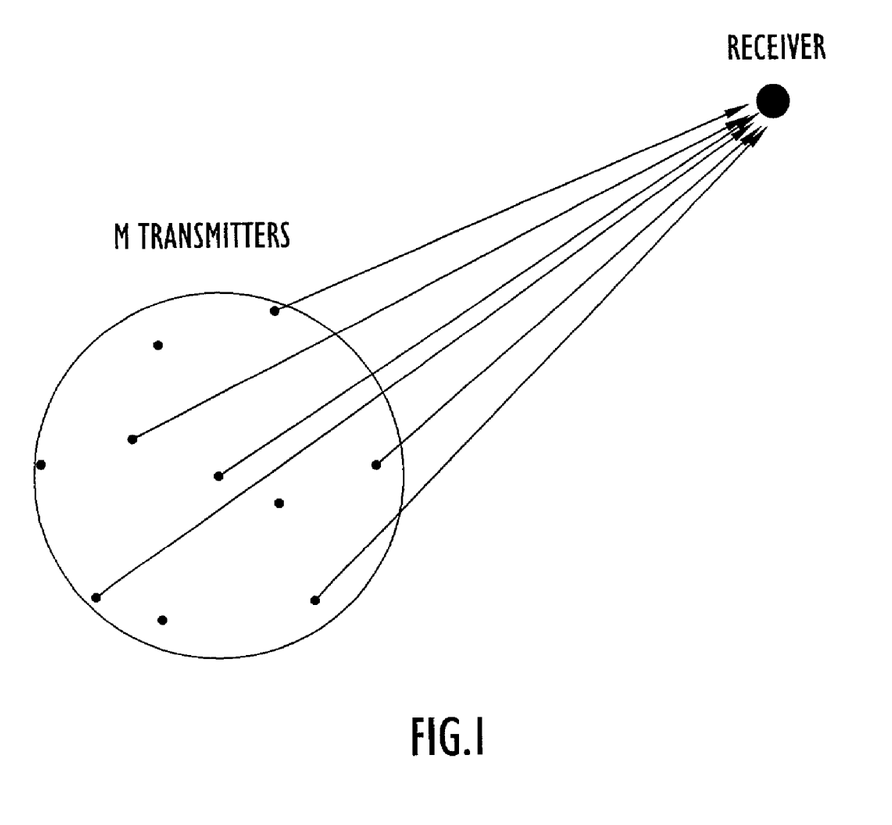
FIG. 1 is a conceptual representation of the technique of the present invention in which a plurality of transmitters communicate with a receiver by synchronously transmitting the same signal.

A representation of the concept underlying the present invention is illustrated in FIG. 1. Each of a plurality of M communication devices is located within a limited geographical area, such that each of the communication devices can directly communicate with at least one of the other M communication devices, thereby enabling radio communication among the communication devices. A group of communication devices so arranged can be considered to be in a "cluster." As used herein and in the claims, the term "cluster" refers to a set of two or more communication devices so position to permit a coordinated transmission of combinable signals from the communication devices to a common receiver. While the term cluster generally implies some degree of relatively close proximity, the present invention is not limited to any particular maximum distance between devices in the cluster or maximum outer boundary for the cluster. Preferably, although not strictly required, all of the M communication devices are within the field of view or line of sight of each other, such that any two of the devices can communication with each other directly. Some of the transmitters may also be in motion relative to the other transmitters and to the receiver.

As used herein and in the claims, a "communication device" includes any device, mobile or stationary, that is capable of transmitting and/or receiving communication signals, including but not limited to: a handheld or body-mounted radio; any type of mobile or wireless telephone (e.g., analog cellular, digital cellular, PCS or satellite-based); a pager, beeper or PDA device; a radio carried on, built into or embedded in a ground-based or airborne vehicle; any portable electronic device equipped with wireless reception/transmission capabilities, including multimedia terminals capable of receiving/transmitting audio, video and/or data information; and any device mounted in a fixed location with transmission/reception capabilities.

While the signals transmitted from the different transmitting communication devices arrive at the receiving communication device at different times, it should be understood that the signals are nevertheless transmitted on the same communication channel in much the same manner as multipath signals from a single transmitter are on the same communication channel. Thus, for example, if the system employs code division multiple access (CDMA), all of the transmitted signals are spread using the same code (e.g., the same PN code, Walsh function, etc.). Likewise, if the system employs frequency division multiple access (FDMA), all of the transmitted signals are on the same frequency channel within the available frequency band.

At least one receiving communication device is remotely located from the cluster of transmitting communication devices. To be useful in transmitting signals to a particular receiver, each of the M communication devices must be positioned such that its transmitted signals can travel over a path to the receiver and contribute to the power of the combined received signal. As shown in FIG. 1, the receiver may be located at a considerable distance from the communication devices in the cluster. In fact, an important aspect of the present invention is the ability to receive signals from the cluster of communication devices beyond the maximum reception range possible with an individual communication device transmitting at a specified power level. Due to the distance between the cluster of transmitters and the receiver, the signal quality of the communication between individual transmitters and the receiver may be poor. However, by synchronously combining each of the transmitted signals at the receiver as multipath rays corresponding to a single signal, the gain of the received signal may be significantly increased.

While the advantages of the present invention are readily apparent in scenarios where the receiver is located relatively far from the cluster of transmitters, it should be understood that the present invention is not limited to any particular receiver location or any particular minimum range from the cluster. For example, the signal combining technique of the present invention can be implemented such that when the receiving communication device is well within the operating range of the transmitting devices, the transmit power of each of the transmitting devices can be reduced accordingly.

The communication devices in the cluster transmit the same signal to the receiving device and coordinate their respective transmit times such that the signals arrive at the receiver within a narrow time window that allows the receiving device to constructively combine the plural signals. One of the transmitting communication devices is identified as the lead communication device. The lead device communicates with other devices in the cluster to coordinate transmission of a signal to the receiving device. Preferably, the lead communication device is the device initiating transmission (i.e., the device whose operator desires to transmit a message to the receiving communication device).

The lead device can be any of the devices in the cluster. For example, consider the case where the communication devices are in a peer-to-peer network. A key design premise of a peer-to-peer network is that there are no pre-determined "lead" devices. Following this fundamental principle, any transmitter wanting to initiate a synchronized transmission will communicate this intention to neighboring devices via special message. The initiating device does not need to know where the other members of the network are, nor how many devices there are to receive the message. The cluster of transmitting devices then operates to simultaneously transmit a data communication signal comprising a known data sequence portion or acquisition/synchronization portion and an information bearing signal portion containing the communication of interest to be transmitted to the receiving device. Note that each transmitter operates to transmit the same information bearing signal portion and also transmit the known data sequence portion or a serial probe portion.

In accordance with an exemplary embodiment, the transmitting communication devices attempt to transmit their respective measurements at the same instant in order to minimize the span of time over which the signals arrive at the receiver. Of course, due to synchronization errors and variations in processing times, the actual transmit times of the signals from the respective transmitting communication devices may vary slightly. More generally, the signal transmit times of the transmitting devices may differ to a limited extent, either by design or due to system timing errors, so long as the arrival times of the signals at the receiving device fall within a time window that enables the receiving device to combine the signals. Accordingly, the phrase "substantially simultaneously" as used herein and in the claims in connection with transmitting signals means that the signals are transmitted close enough in time to be received by the receiver within a time window that permits the signals to be combined.

In accordance with the exemplary embodiment, the overall system is synchronized relative to the Time-of-Day (ToD). Initially, the first communication device in the cluster which is turned on, $R_1$, will receive a signal indicating ToD to a resolution of 1 nsec (this is resolution not accuracy), for which 64 bits are sufficient. Specifically, for a one-hundred-year interval, $$D=100*365*24*60*60*1000*1000*1000=3.154 \times 10^{18}$$

$$Nbits=\log 10(D)/\log 10(2)=61.5$$

Communication device $R_1$ initiates the clock counter and broadcasts a ToD message, $M_{ToD}$, to all other communication devices in the cluster network. The network communication devices $R_2 \ldots R_N$ will receive $M_{ToD}$ and set their own clock counters relative to the ToD contained in the message, thereby establishing a common time reference among the devices.

The radius which covers all the network radius is related to the multipath window as follows. A radiowave propagates at a velocity of $3.333 \ 10^{-6}$ sec/km (3.333 μsec/km). This means that, in a network having a cluster of devices spread over a radius of 1 km, the ToD will be offset by at most 3.333 μsec. This coarse synchronization is sufficient for the system of the present invention to work correctly, provided that the multipath window at the receiver includes the propagation delays necessary to receive all transmitters. For example, a multipath window of ±25 μsec will readily be able to receive and combine all signals transmitted from the cluster, as described in greater detail hereinbelow.

To effect a transmission, one of the communication devices $R_i$ distributes a message $M_{data}$ to N neighboring communication devices that will be required to transmit in synchronism. This message contains a specified future ToD, $T_0$ when the transmission will occur as well as the destination address of the receiving device, designated $R_K$. Observe that $T_0$ can be any time beyond the maximum propagation delay for the network radius. At the specified time $T_0$, the N radios transmit the specified message to a sole destination $R_K$. The receiver at $R_K$ will receive all transmissions with maximum offsets given by the initialization propagation delay, $d_{initial}$, plus the message transmission propagation delay, $d_{tx}$, plus the local clock time drift, $L_{drift}$. With a local clock (oscillator) accurate to ±1 part per million ($10^{-6}$), the total time offset will be:

$$T_{offset}=3.333 \ \mu sec+3.333 \ \mu sec+1 \ \mu sec=7.666 \ \mu sec,$$

which is well within the ±25 μsec multipath window stated above. This means that the receiver will appropriately combine the signals as though they were multiple reflections of an original signal. Importantly, no precise phase synchronization is required at the transmitters, since all that is required is that the set of transmitted signals arrive within the multipath window at the receiver. Like multipath components, the several signals transmitted by the different transmitters in the present invention arrive at the receiver with completely random phases. It is the function of the multipath combiner at the receiver to align the phases of the arriving signals. It should be understood that the invention is not limited to the specific values used in the foregoing example. In general, the system will operate correctly if the multipath window is set to cover twice the maximum propagation delay plus the local clock offset. For any specific system, this would be a relation between the maximum distance and how accurate (and expensive) the local oscillators are made.

Any suitable messaging scheme can be employed by the cluster of transmitting communication devices, provided the scheme permits the lead communication device to arrange the substantially simultaneous transmission of the message from the group of transmitting devices. By way of non-limiting example, the lead communication device can send a special Request to Send (RTS) message to the neighboring communication devices. When receiving the special Clear to Send (CTS) from the neighboring devices, the lead device then initiates transmission within a given delay time. The time delay can synchronized by Time of Day and directly derived from the Key Generator Transition switching point, i.e. the Epoch. This is the point where the KG is reloaded to generate new non-linear spreading sequences. The time interval, or Epoch, depends on the particular system, and for reference purposes can be set initially to 1 sec.

According to another approach, the device whose position is determined to be closest to the receiving device may be designated as the lead device. In this case, the transmitting devices communicate with one another to obtain a precise geographic location of one of the transmitting devices, such as the transmitting device closest to the receiving device or the lead device. Such a determination may be made using a variety of methods including use of global positioning system (GPS) data for determining precise geometric coordinates. It should be understood, however, that in general, position information is not necessary for the correct functioning of the system of the invention. Insofar as the time delays from each transmitting station are within the multipath window set by the receivers, the system will work correctly.

As previously noted, because of the distributed locations of the transmitters, the simultaneous transmissions from the cluster of transmitters arrive at the receiver at different time offsets relative to one another. In accordance with the present invention, at the receiver, the signals transmitted from the individual communication devices in the cluster are essentially treated as though they are different multipath rays of a single transmission, and multipath countermeasures are used to process and combine the received transmissions from the different communication devices. As will be explained in greater detail hereinbelow, this task is accomplished using a multipath combiner device, such as an equalizer, with the optional addition of a serial probe.

A brief explanation of the phenomenon of multipath fading will aid in understanding operation of the receiver of the present invention. In terrestrial-based radiowave propagation, multipath interference occurs when reflected rays originating from a radio transmitter arrive at the receiver delayed in time by $\tau_m$ relative to the arrival time of the direct-path ray. The delayed signals will then combine constructively or destructively with the direct-path ray and with each other, depending on their relative phases at the receiver antenna, giving rise to the phenomenon called multipath fading. A simple baseband equivalent model can illustrate the problem. A received signal is given by:

$$r(t)=\Sigma a(t)\exp(-j2\pi f_c \tau_n(t)) \quad (1)$$

where the received signal is the sum of a number of time variant vectors (phasors) having amplitudes a(t) and phases $\theta=2\pi f_c \tau_n(t)$. Note that a change in amplitude requires a large change in a(t), while $\theta$ will change by $2\pi$ every time that $\tau$ changes by $1/f_c$. For example, at frequency $f_c$=2,400 MHz, $1/f_c$=0.5×10$^{-6}$ seconds. Since radio waves travel at approximately one ft/nsec, a path delay at higher frequencies does cause significant changes in the phase of the signal, causing the signal distortion known as multipath fading.

This is further complicated by motion. If the transmitter and receiver are moving with respect to each other, then another key aspect of the multipath fading is the fade rate, which is a function of the relative velocity between the transmitter and the receiver location at points A and B, where A and B are separated by the distance traveled by the receiver at velocity v. The difference in path lengths traveled by a wave due to the movement of the receiver, measured in wavelengths, $\lambda$, yields a phase difference $\Delta\Phi=2\pi\Delta l/\lambda$, where $\Delta l=v \Delta t \cos(\theta)$, where $\theta$ is the angle between transmitter/receiver path and the direction of movement. The waves will be exactly at opposite phases at a rate given by the Doppler shift:

$$f_d=(1/2\pi)(\Delta\Phi/\Delta t)\cos(\theta)=(v/\lambda)\cos(\theta) \quad (2)$$

Consequently, the signal will have deep fades at the Doppler rate.

Doppler Spread is defined as the frequency interval $f_c-f_d$, $f_c+f_d$. Coherence Time ($T_c$) and Doppler spread characterize the time varying nature of the channel, caused by the relative motion of transmitter and receiver and by the movement of reflective objects in the channel. The coherence time $T_c$ gives the interval of time over which the fading characteristics will not change, i.e., an equalizer will have to be re-trained at $T_c$ intervals of time. For a velocity of 500 mph, $T_c$=229×10$^{-6}$ seconds.

As will be appreciated from the foregoing explanation of multipath fading, an analysis of a signal-combining system is quite complex for operations in restrictive environments, because the nature of multipath characteristics varies with time. As a result, the transfer function of the transmission medium is time varying, which may be characterized statistically in terms of the coherence bandwidth and time of the channel. To assure analytical tractability, the mathematical model for a signal combining system is described based on the concept of diversity. It is assumed that there are L diversity channels, each carrying the same information-bearing signal. The fading processes among the L diversity channels are assumed to be statistically independent.

The system according to the present invention employs a multipath combiner or equalizer, often called a "rake" receiver. A rake receiver generally includes parallel correlator circuits which receive signals incoming from different signal paths. In code division multiple access (CDMA) systems, for example, several components are resolved at a resolution equal to the chip period and are coherently combined. Coherent combining of the signals requires that the signal have substantially the same phase and frequency. Thus, in multipath fading environments, instead of losing a signal by destructive interference of multipath components, two or more different path signals are received, and phase adjustment is made to provide constructive combining of these signals.

Figure 2:
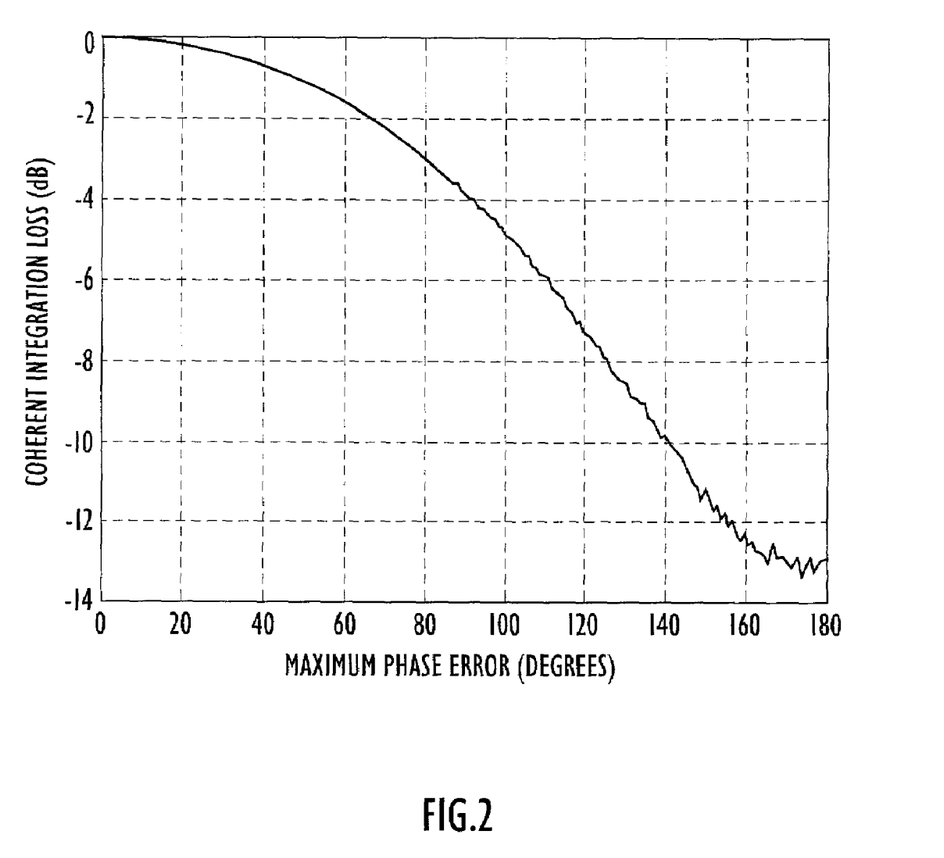
FIG. 2 is a graph illustrating the coherent integration loss due to phase errors among received signals.
Figure 3:
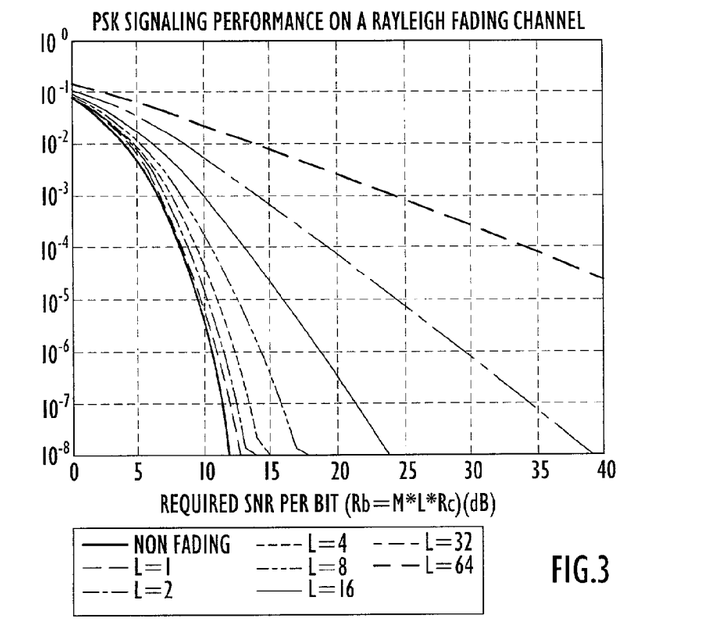
FIG. 3 is a graph illustrating achievable communications performance of an exemplary embodiment of the present invention on a Rayleigh fading channel for PSK signaling.
Figure 4:
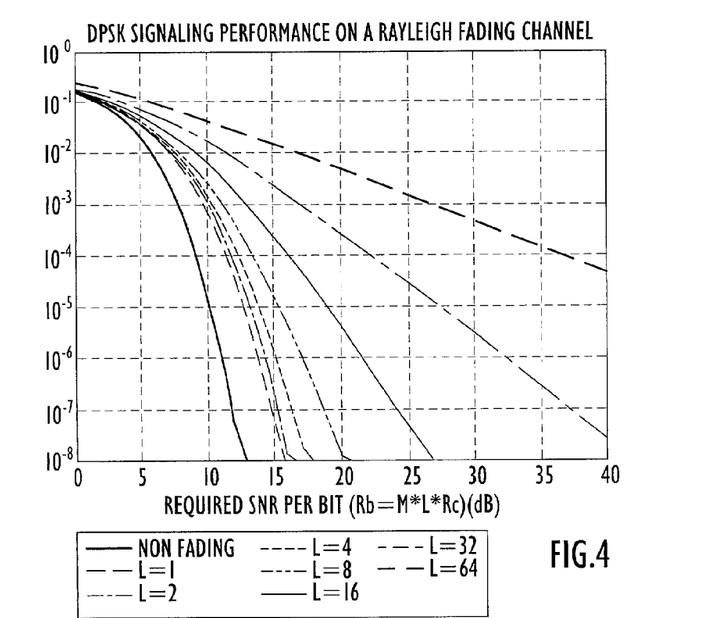
FIG. 4 is a graph illustrating achievable communications performance of an exemplary embodiment of the present invention on a Rayleigh fading channel for DPSK signaling.
Figure 5:
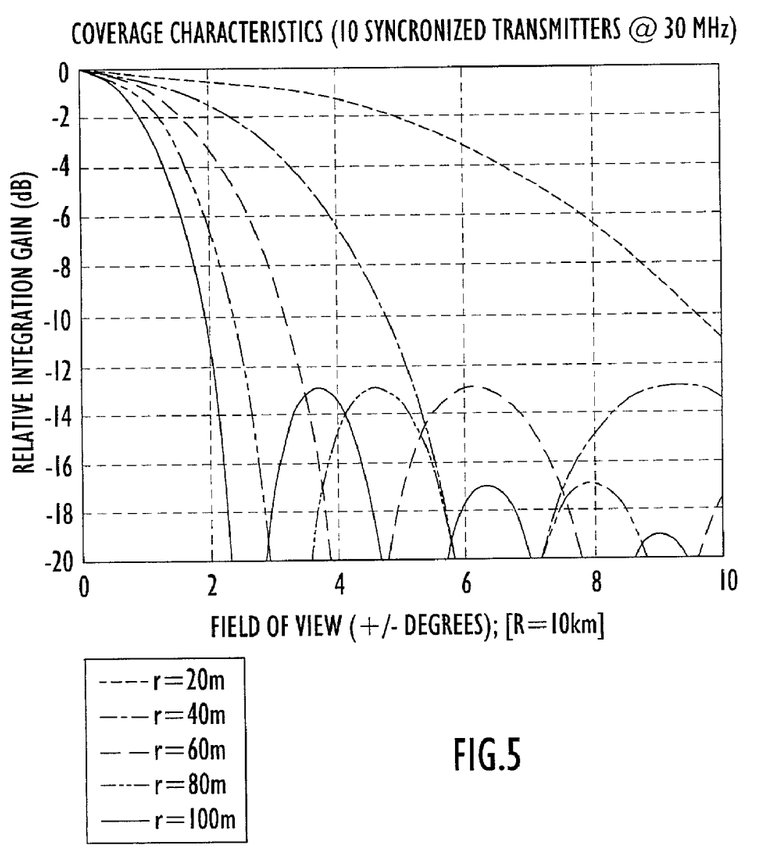
FIG. 5 is a graph depicting the coverage characteristics for ten synchronized transmitters in terms of coherent integration gain according to one embodiment of the present invention.

In accordance with an exemplary embodiment of the present invention, the rake receiver employs a tapped delay line through which the received signal is passed. The signal at each tap is properly weighted and summed, in effect, to collect the signal energy from all the received signal paths that fall within the span of the tapped delay line and carry the same information. FIG. 2 shows the coherent integration loss due to phase errors among the received signals. Note that significant gains can be realized as long as phase errors among the received signals can be maintained within 90 degrees. FIGS. 3 and 4 illustrate the communications performance of the signal combining technique of the present invention on a Rayleigh fading channel for PSK and DPSK signaling, respectively. The communications performance is shown in terms of the probability of a bit error (BER) as a function of the required signal-to-noise (SNR) per bit in dB. The required SNR per bit, denoted by $R_b$, is L times the SNR per bit per channel, denoted by $R_c$. L indicates the order of diversity. For a given BER, the required $R_b$ can be determined, and then the required $R_c$ for each transmitting channel can be estimated. With the order of diversity, the performance gain of the signal combining system of the present invention over a single radio system can easily be estimated. FIG. 5 depicts the coverage characteristics for ten synchronized transmitters in terms of coherent integration gain.

Figure 6:
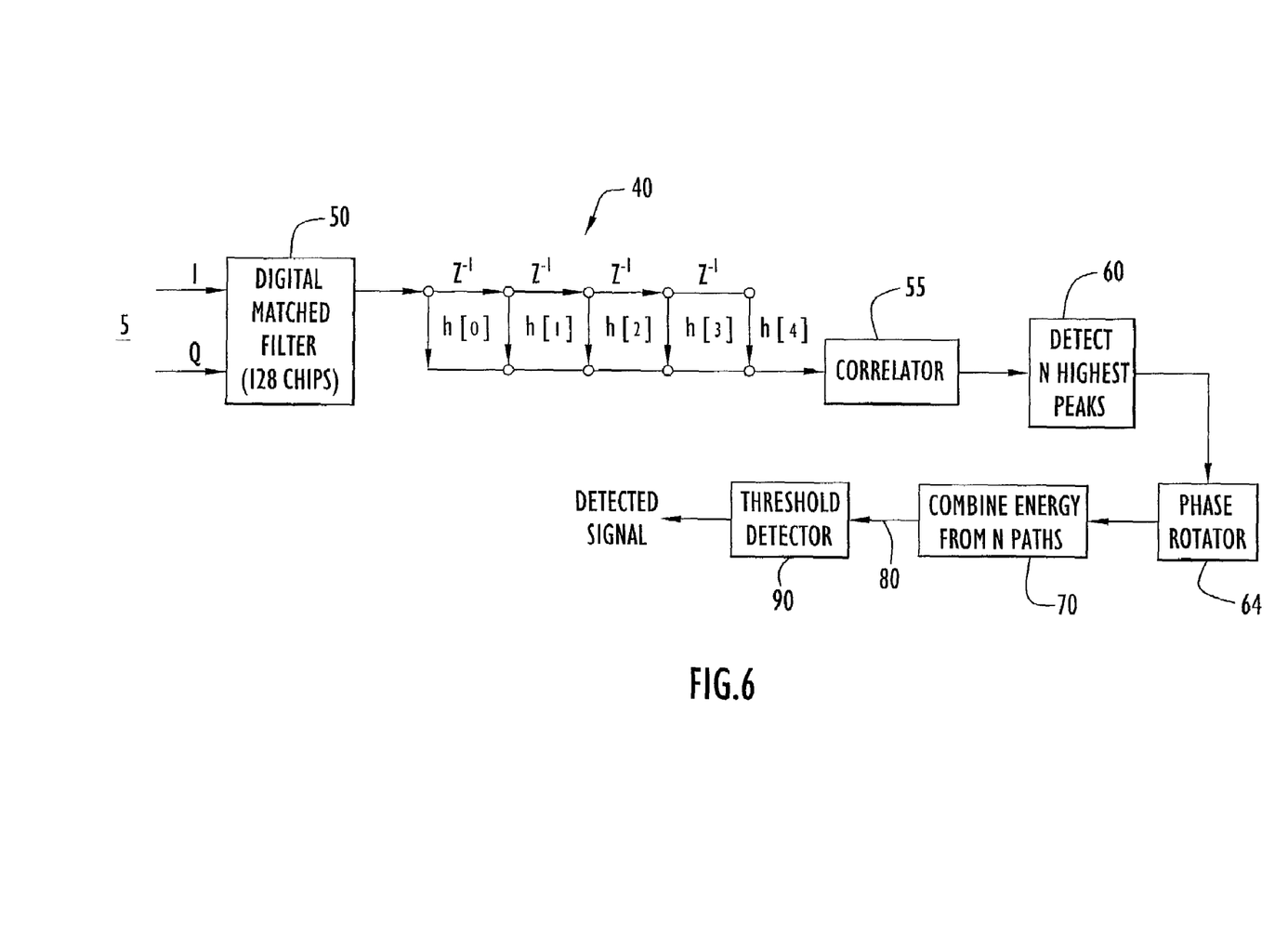
FIG. 6 is a schematic block diagram of a synchronous combining receiver according to an exemplary embodiment of the present invention.

A schematic block diagram of the receiver system according to a present invention is shown in FIG. 6. A front end of the receiver (not shown) is coupled to an input terminal 5.

The front end of the receiver may include a tuner and intermediate frequency (IF) stage, an analog-to-digital converter, and a 90 degree phase shifter coupled together in a known manner to produce various clock signals required by circuitry in the receiver in synchronism with the received signal. The timing reference generator and clock recovery circuit may also be located after the multipath equalizer.

The receiver front end digitizes the IF signal to produce and in phase (I) component and then rotates the digital signal to obtain the quadrature (Q) component, and the digital I and Q components are received at the input terminal 5. The I and Q signals are supplied to a digital matched filter 50 whose output is supplied to the multipath equalizer or combiner comprising a plurality of tap delay lines 40 for receiving each of the phased shifted data communication signals. Each tap delay line has corresponding weighting coefficients h[0], h[1], . . . h[m] associated with each of the received channels for adjusting the amplitude and phase of the received signal in order to equalize the signals. Each of the tap delay lines is coupled to a correlator 55 for providing a correlation signal indicative of the amount of correlation among the received time delayed signals. The peaks of the correlation signal are detected in a detector 60 which is coupled to phase rotator 64 for rotating the phase of the detected peak signal to allow for coherent combination. Detector 60 detects the N highest peaks received from correlator 55. In general, any practical number of peaks N which exceeds a given threshold can be detected up to the total number of peaks. Unless limited by hardware or processing considerations, it is preferable to select and process all peaks exceeding a given threshold; however, in certain circumstances it may be preferable to specify a predetermined maximum number of peaks to be processed.

The phase-rotated signals produced by phase rotator 64 are received by a combiner 70 which coherently combines each of the detected peak signals to produce a combined output 80. Phase rotator 64 essentially time aligns the separate signals by ensuring that the relative phases of the signals are within a certain number of degrees of each other, such that a significant integration gain will result when the signals are coherently combined. A threshold detector 90 compares the combined signal 80 with a predetermined threshold to determine whether or not a true signal is present. The combined detected signal has a gain exceeding that of each of the individual data communication signals, and is indicative of the data communication signal.

The rake receiver operates on each of the received data communication signals from the simultaneous transmission of the transmitting devices as if the transmissions were multipath signals from a particular source. The present invention utilizes such information to enhance the gain by combining these signals in synchronous fashion. In a practical implementation, important aspects of the system include the use of Direct Sequence Spread Spectrum (DSSS) and a Digital Matched Filter (DMF). The DSSS expands the data pulse bandwidth with a secondary modulation called chipping. For example, with a 1 MHz (Megabits per second) signal spread with a 32 MHz chipping signal the symbol duration is $T_s$=1 µsec, and a chip duration $T_c$=31.25 nsec. Consequently, each stage in the DMF is 31.25 nsec apart, such that different signal paths separated by at least 31.25 nsec will be recognized.

Another important aspect of the invention is that the signal is sampled at the Nyquist rate (two times the chipping rate, or 64 MHz), such that the system produces one output of the DMF at the sampling rate, i.e. 64 MHz, meaning that each 15.625 nsec there will be an output. Over a period of 1 µsec, there are 64 outputs and, over a period of 0.250 µsec, there are 256 outputs, which is consistent with the synchronization speed of practical systems. Theoretically, all these outputs can be combined with a Digital Filter (Finite Impulse Response). This FIR would then be an "equalizer", since having a definite mathematical relationship between the input and the output impulse responses of an equalizer FIR makes it indeed an equalizer. However, the present invention does not require a true equalizer. In accordance with another implementation, heuristic "combining" can be used, i.e., phase matching and adding the magnitude of selected paths. The combining approach can be advantageous where hardware limitations or costs are a consideration. The particular combining/equalization method is not critical to the invention. An equalizer combiner will produce better results than a non-equalizer combiner; however, within a given signal to noise ratio limitations both approaches work.

The serial probe provides an instantaneous measure of the channel impulse response at the coherence time intervals. Essentially, the serial probe involves a sequence of known pulses which can be identical to the synchronization sequence which can be used to determine how the signal was distorted in the channel. The channel impulse response accounts for the relative motion, not only between the receiver and the transmitter, but the relative motion between the transmitters. The serial probe provides information to set the RAKE combiner tap weights (this can be understood as the coefficients in a Finite Impulse Response (FIR) filter). This minimizes the losses due to channel variability as well as frequency offsets due to Doppler shifts. The serial probe is not strictly necessary for the system of the present invention to operate correctly; however, performance is degraded without the serial probe.

The serial probe is preferably identical to the synchronization sequence in the transmitted message, for example, sixteen words of 4 µsec duration each. The chip pattern changes according to the KG Epoch; however, the underlying symbol pattern can remain the same or change with the Epoch as required for different missions. The symbol pattern is an M-Sequence generated by a Linear Sequence Generator, e.g., 16, 12, 3, 1.

The serial probe is inserted at intervals determined by the Coherence Time. This is the time over which the channel impulse response is invariant, and it is dependent on frequency given by:

$$T_c = \sqrt{\frac{9}{16\pi f_m^2}}$$

The serial probe is processed at these intervals and all the subsequent symbol inputs are processed with the information (tap weights) derived from the last probe. The serial probe is also used to resynchronize the system, i.e., the peak correlation output of the probe sets the initial time to for the subsequent symbols.

According to an exemplary embodiment of the present invention, the rake receiver may be embodied within a digital radio. For example, such a system may comprises a burst packet local area network having a layered architecture, where communications are established at the applications level and remain until one of the participants terminate it. Such a transmitter and receiver system may utilize a frequency or code division multiple access communications scheme (or both) comprising a combination of channel sense multiple access/collision avoidance (CSMA/CA) and code division multiple access (CDMA) techniques for enhancing system throughput.

In this exemplary embodiment, by way of non-limiting example, four 20 MHz channels are available within a 2400–2800 MHz frequency band and several signals may be superimposed within the same time bandwidth, through the use of appropriate spreading codes. Note that, in the transmitter and receiver system described above, signaling comprises two different modulations; data modulation and spreading modulation. A modem operable within the transmitter/receiver system spreads the baseband signal (not the up converter frequency) with a quadrature modulation, such that the bandwidth can be contained within 20 MHz. The data modulation comprises a binary phase shift key (BPSK) sequence, while the spread modulation is an offset quadrature phase shift key (OQPSK) having 16 megachips per second (Mcps) for the in-phase component and 16 Mcps for the quadrature component.

Figure 7:
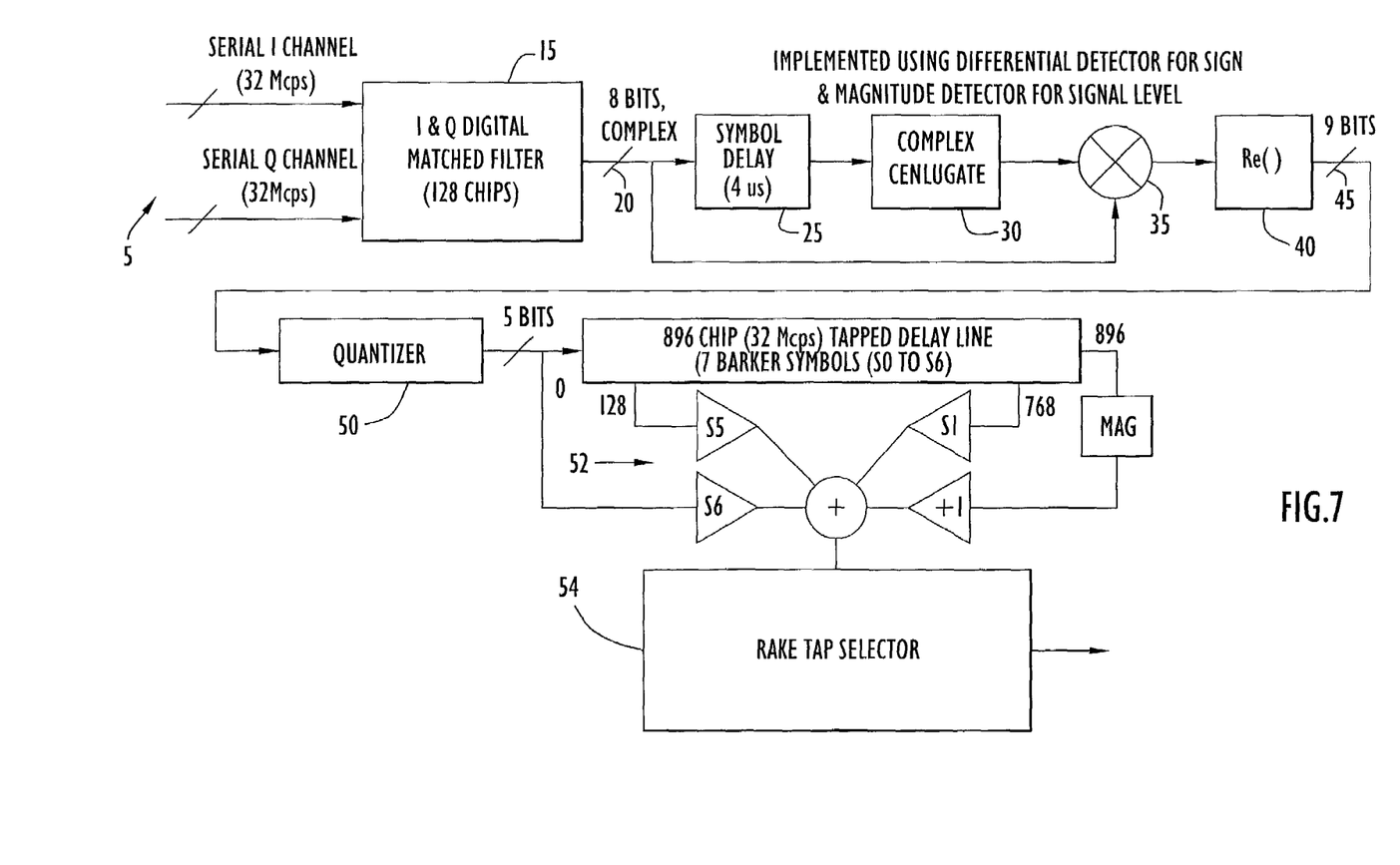
FIG. 7 is a more detailed circuit diagram of the differential detection tap delay and rake tap selection processing of the synchronous combining receiver according to the exemplary embodiment of the present invention.

FIG. 7 is a more detailed block diagram of the rake receiver components illustrating differential detection tap delay and the rake tap selection processing implemented within the device of the exemplary embodiment for acquiring and estimating signal channels to adaptively control network communications for enhancing the gain of received signals. Referring to FIG. 7, in phase (I) and quadrature (Q) channel signals are supplied to digital matched filter 15 to provide pulse shaping of the input signal. Output signal 20 from filter 15 comprises an 8 bit complex data sequence which is delayed (module 25) and the complex conjugate obtained via module 30. The complex conjugate output is then multiplied (module 35) with signal 20 and the real part 45 of the signal is produced by module 38. Signal 45 is received by a quantizer 50 which quantizes the signal to 5 bit values, and an 896 chip (32 Mcps) tapped delay line 52 using weighted taps operates to perform the multipath equalization. Rake tap selection processor 54 is responsive to the output of tapped delay line 55 for performing threshold detection and acquisition.

Any of a variety of transmission protocols or schemes can be used transmit signals between the cluster of communication devices and the remote communication device receiving the combined signals. By way of non-limiting example, the communication devices can communicate with each another via packet transmission using a carrier sense multiple access with collision avoidance (CSMA/CA) scheme. With CSMA/CA, each packet transmission between two communication devices typically involves an exchange of four short bursts. First, a request to send message (RTS) is sent from the sending device to the receiving device. The receiver device then responds upon receipt of the RTS message with a clear-to-send message (CTS). A data message (MSG) is then transmitted from the sending device, and an acknowledgment message (ACK) is sent from the receiving device upon reception of the data message. If the data message is not successfully received, the receiving device can sent a no acknowledgment (NAK) message back to the sending device or simply not send any message within a time out period, indicating to the sending device that the data message was not successfully received.

Figures 8A, 8B, 8C, 8D:
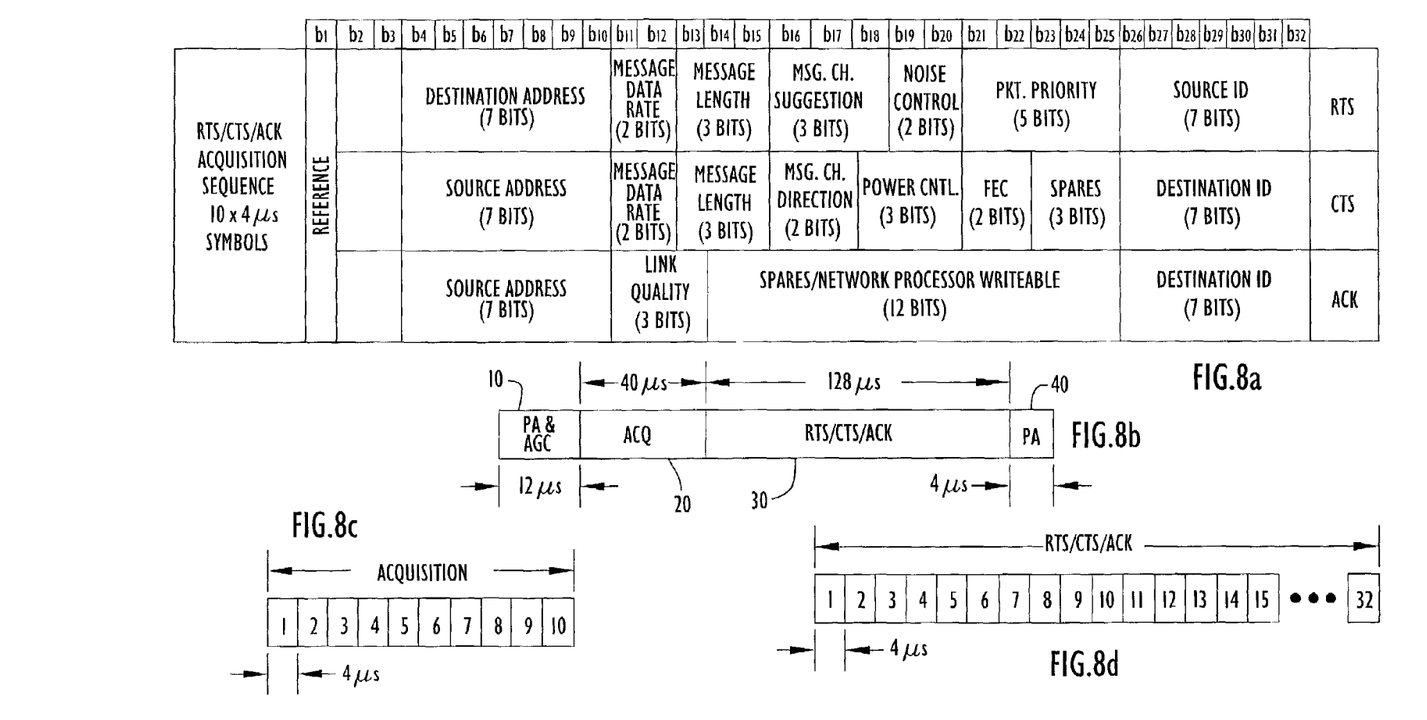
FIGS. 8A–8D illustrate formats for RTS/CTS/ACK data packets used for CSMA/CA message transmission in accordance with an exemplary embodiment of the present invention.

FIGS. 8A–8D illustrate exemplary formats for the RTS/CTS/ACK data packets used for message transmission. The RTS/CTS/ACK acquisition sequences comprise ten 4 μsec. symbols as shown in FIG. 8A. Referring to FIG. 8B, acquisition data portion 20 is approximately 40 μsec. in duration, while the RTS/CTS/ACK message portion 30 is approximately 128 μsec. A power amplifier (PA) and automatic gain control (AGC) header portion 10 of 12 μsec. in duration provides gain control information at the beginning of the message, while PA tail portion 40 having a 4 μsec. duration provides end of data information (amplifier rise and settle times). The RTS/CTS/ACK message portion 30 is provided in greater detail in FIG. 8D. FIG. 8D shows the 32 bit sequence where each bit element has a duration of 4 μsec. The acquisition data sequence 20 is further illustrated in FIG. 8C, which shows a 10 symbol sequence having a temporal duration of 4 μsec per symbol.

In a DSSS system where each symbol is spread with different spreading sequences, the multipath window can cover several symbols. If the symbols were spread with the same sequences, then multipath rays which are delayed more than one symbol cannot be combined, since this would present the risk of combining two different symbols (virtually destroying them). In the system of the present invention, with different spreading sequences for each symbol, a reflected component of symbol $S_K$ which will produce a correlation peak only with reference $R_K$. Thus, the reference is kept for as long as the desired length of the multipath window.

As can be seen from the diagram of FIG. 8A, the first bit or symbol b1 within the sequence represents a reference bit, while bits two and three are indicative of the message type (i.e. RTS, CTS, or ACK). The next seven bits (b4–b10) indicate the destination address (for RTS) or source address (for CTS and ACK) messages. The RTS message further includes the message data rate (bits b11, b12) message length (b13–15), suggested message channel (b16–18), and noise control bits (b19–20). A 5 bit packet priority and 7 bit source ID are then appended to the RTS message spreading sequence.

In similar fashion, the CTS message portion further includes a message data rate (2 bits), message length (3 bits), message channel direction (2 bits), power control portion (3 bits), FEC portion (2 bits) and a destination ID (7 bits). Three spare bits (b23–26) are also included within the CTS message type. Finally, the ACK message includes an indicating of the link quality (3 bits, b11–13) and a 12 bit network processor writable and spare capacity segment, in addition to the 7 bit destination ID.

Thus, FIGS., 8A-8D illustrate the communication protocol used among transmitter and receiver devices for communicating over 16 MHz signal bandwidths (20 MHz including the guard band). Note that the communication process identified above terminates a transmission between the receiver and transmitter, even though the two terminals are still connected at the application level. In this manner, each packet is transmitted independently of all the other packets, so that there is no signal in the air that indicates that the receiver and the transmitter are connected in any way. This advantageous feature minimizes the potential for eavesdroppers to detect and/or identify the location of the transmitting and receiving devices. Note however, that the packets do include sequencing information to allow the receiver to reconstruct the entire message.

Figure 9A:
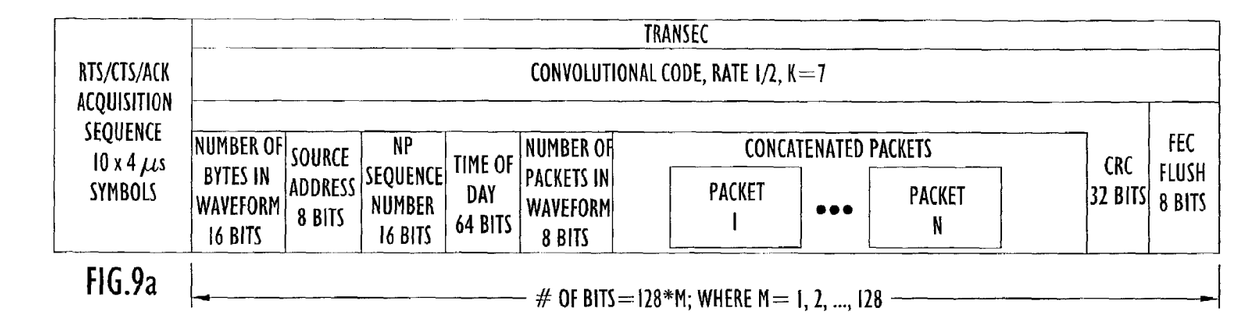
FIGS. 9A–9D illustrate formats for TRANSEC data packet communication in accordance with another embodiment of the present invention.
Figures 9B, 9C, 9D:
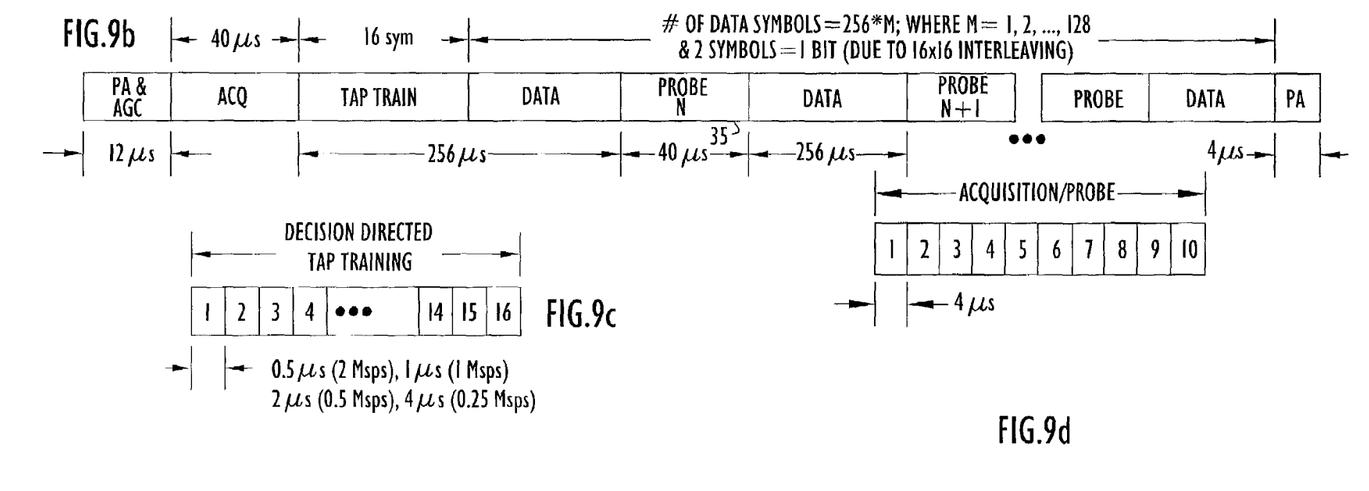

For TRANSEC communications, FIGS. 9A–9D illustrate the format for the network packets for RTS/CTS/ACK message transmission using a convolutional code rate of ½ and K=7 error correcting code. FIG. 9A provides the overall TRANSEC format, while FIG. 9B illustrates specific message segment formats including the acquisition portion, tap train portion, data portion, and probe portions of the message. Decision directed tap training portion, as shown in FIGS. 9B and 9C, represents a 16 symbol field of variable duration ranging between 0.5 μsec. (2 Msps), 1 μsec. (1 Msps), 2 μsec. (0.5 Msps) and 4 μsecs. (0.25 Msps).

As shown in FIG. 9B, the data probe portion 35 comprises a known bit pattern which is inserted by the modem into the signal at selected time intervals derived from propagation theory, and which provides an instantaneous measure of the channel impulse response in the environment in which the unit is operating in. The communication device's modem probes the channel on a period of about 75% of the worst case channel coherence time. Note that data symbols time sequenced just prior to probe portion N+1 still use the channel identified by probe N to receive the signal waveform. The modem uses decision directed feedback to track changes in the channel phase, but does not attempt to locate new multipath waves prior to the next data probe portion. Thus, even though the total energy in the channel is held constant, some energy may move from the taps currently being received into one or more of the unmonitored time delays.

Having combined and detected the signals from plural transmitting devices in the cluster, the receiving communication device may then reply to the message as necessary. Depending on the power restrictions on the receiving communication device, the reply message may be sent back to the originating device via a single transmission at a higher power level, or, where the receiving communication device is itself among a cluster of devices under similar power restrictions (e.g., a second convert squad located at a distance from the first covert squad), the same signal combining technique can be used to send signals back to the originating device.

It should be understood that the present invention is not limited to any particular protocol, messaging scheme or type of channel access, and is useful in any context or network that would benefit from an increase in the power of received signals resulting from the combined power of distributed transmitters. For example, consider a network of communication devices which transmit with very low power due to cost, power and/or RF emissions considerations. While many if not all of the communication devices in the network may be within each other's fields of view, the power limitations may make direct communications between certain devices impossible. One conventional solution to this problem would be relay messages using intermediate devices in the network. In accordance with the present invention, another approach is for the device from which the message originates to command devices within its operating range to simultaneously transmit signals containing the same message, such that the intended receiving device, which may not be within the operating range of the originating device alone, is nevertheless within the extended reception range resulting from combining the signals of the group of transmitters. In this manner, the technique of the present invention may avoid delivering the signal via multiple "hops" (i.e., through multiple intermediate devices), and may potentially simplify signal routing algorithms and reduce the need for routing tables in certain types of networks.

The signal combining technique of the present invention has applicability in the context of military or covert field operations. For example, a squad of soldiers or a reconnaissance team equipped with radios may be required to transmit using very low power levels to minimize the risk of being discovered by hostile forces or revealing their location. At such power levels, reliable communications may be difficult to achieve between individual radios in the squad and a receiver at a command center located at a considerable distant from the squad. In accordance with the present invention, range performance can be enhanced in this scenario without increasing the transmit power of individual radios in the squad by substantially simultaneously transmitting the same signals from some or all of the radios in the squad and combining the signals at the distant receiver.

Although the communication devices of the present invention have described herein as being mobile devices, the invention encompasses systems in which some or all of the devices are stationary. For example, the present invention may be useful in networks deployed with office buildings, hotels, parking garages and/or malls, wherein certain communication devices have fixed positions.

Having described preferred embodiments of a new and improved methods and apparatus for synchronously combining signals from plural transmitters, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In a communication system comprising at least a plurality of transmitting communication devices and a receiving communication device, a method of combining signals respectively transmitted from the transmitting communication devices to enhance reception at the receiving communication device, comprising:

(a) coordinating transmissions of the plurality of the transmitting communication devices by establishing a lead communication device among the transmitting communication devices, wherein the lead communication device communicates with the other transmitting communication devices to schedule a time at which the lead communication device and the other transmitting communication devices are to send a transmitted signal to the receiving communication device, thereby establishing a common time reference among the transmitting communication devices, such that a plurality of transmitted signals are respectively transmitted over the same communication channel by the plurality of transmitting communication devices substantially simultaneously using a carrier sense multiple access with collision avoidance (CSMA/CA) protocol, each of the transmitted signals including an information signal which is coherently combinable with corresponding information signals in others of the transmitted signals;

(b) receiving the transmitted signals at the receiving communication device such that respective arrival times of the transmitted signals are offset from one another as a function of respective positions of the transmitting communication devices;

(c) time aligning the transmitted signals to compensate for the respective arrival times of the transmitted signals;

(d) combining the transmitted signals to form a combined signal including at least a combined information signal; and (e) detecting the combined signal to determine the presence of the transmitted signals.

2. The method of claim 1, wherein:
each of the transmitted signals further comprises an acquisition signal;
(b) includes correlating the acquisition signal of transmitted signals received by the receiving communication device to a stored signal to estimate the arrival times of the transmitted signals; and (d) includes combining information signals from at least some of the transmitted signals correlated in (b) to form the combined information signal.

3. The method of claim 2, wherein the acquisition signal in each of the transmitted signals is identical.

4. The method of claim 1, wherein (c) includes phase rotating at least some of the transmitted signals correlated in (b) to adjust a relative timing of the transmitted signals to account for timing offsets among the respective arrival times of the transmitted signals.

5. The method of claim 1, wherein the transmitted signals arrive at the receiving communication device within an acquisition time interval having a duration sufficiently short to permit combining of the transmitted signals.

6. The method of claim 1, wherein the information signal in each of the transmitted signals is identical.

7. The method of claim 1, wherein each of the transmitted signals includes a serial probe comprising a known data sequence, the method further comprising:

(f) determining a channel impulse response from the serial probe.

8. The method of claim 1, wherein the transmitted signals are heuristic combined by phase matching and adding the magnitude of the transmitted signals.

9. The method of claim 1, wherein the transmitted signals are combined using an equalizer.

10. The method of claim 1, wherein at least one of the transmitting communication devices is a mobile communication device.

11. The method of claim 1, wherein the receiving communication device is a mobile communication device.

12. In a communication system comprising at least a plurality of transmitting communication devices and a receiving communication device, a method of coordinating transmission of signals respectively transmitted from the transmitting communication devices to the receiving device, comprising:

(a) establishing a lead communication device among the transmitting communication devices, wherein the lead communication device communicates with the other transmitting communication devices to schedule a time at which the lead communication device and the other transmitting communication devices are to send a transmitted signal to the receiving communication device; and (b) respectively transmitting a plurality of signals from the transmitting communication devices at said time, such that the plurality of signals are respectively transmitted over the same communication channel substantially simultaneously using a carrier sense multiple access with collision avoidance (CSMA/CA) protocol, each of the signals including an information signal which is coherently combinable with corresponding information signals in others of the signals.

13. The method of claim 12, wherein one of the transmitting communication devices commands others of the transmitting communication devices to transmit signals at said time.

14. The method of claim 13, wherein said one of the transmitting communication devices broadcasts a command to said others of the transmitting communication devices.

15. The method of claim 12, wherein a time between commanding of the transmitting communication devices and said time is greater than a longest signal propagation time between transmitting communication devices.

16. The method of claim 12, wherein at least one of the transmitting communication devices is a mobile communication device.

17. The method of claim 12, wherein the receiving communication device is a mobile communication device.

18. A communication system, comprising:

a plurality of transmitting communication devices configured to respectively transmit a plurality of transmitted signals over the same communication channel substantially simultaneously, wherein one of the transmitting communication devices serves as a lead communication device that communicates with the other transmitting communication devices to schedule a time at which the lead communication device and the other transmitting communication devices are to respectively send the transmitted signal using a carrier sense multiple access with collision avoidance (CSMA/CA) protocol, each of the transmitted signals including an information signal which is coherently combinable with corresponding information signals in others of the transmitted signals; and a receiving communication device configured to receive the transmitted signals at respective arrival times which are offset from one another as a function of respective positions of the transmitting communication devices, said receiving communication device time aligning the transmitted signals to compensate for the respective arrival times and combining the transmitted signals to form a combined signal.

19. The system of claim 18, wherein each of the transmitted signals further comprises an acquisition signal and said receiving communication device comprises:

a correlator configured to correlate the acquisition signal of transmitted signals to a stored signal to estimate the respective arrival times of the transmitted signals;

a phase rotator configured to phase rotate at least some of the transmitted signals to adjust a relative timing of the transmitted signals to account for timing offsets among the respective arrival times of the transmitted signals; and a signal combiner configured to combine the transmitted signals to form the combined signal.

20. The system of claim 19, wherein the information signal in each of the transmitted signals is identical, and the combined signal includes at least a combined information signal, the receiving communication device further comprising a signal detector configured to detect the combined signal and determine the information contained in the combined information signal.

21. The system of claim 18, wherein the receiving communication device further comprises:

a digital matched filter configured to generate a matched filter signal based on the transmitted signals received by the receiving communication device.

22. The system of claim 18, wherein the receiving communication device further comprises:

a plurality of tapped delay lines configured to modify the phase and amplitude of the transmitted signals.

23. The system of claim 18, wherein each of the transmitted signals includes a serial probe comprising a known data sequence, and wherein the receiving communication device determines a channel impulse response from the serial probe.

24. The system of claim 18, wherein said receiving communication device heuristically combines the transmitted signals by phase matching and adding the magnitude of the transmitted signals.

25. The system of claim 18, wherein said receiving communication device comprises an equalizer.

26. The system of claim 18, wherein at least one of the transmitting communication devices is a mobile communication device.

27. The system of claim 18, wherein the receiving communication device is a mobile communication device.

28. A communication device for detecting a plurality of signals respectively transmitted substantially simultaneously from a plurality of transmitting communication devices over the same communication channel, the communication device comprising:
   a digital matched filter configured to generate a matched filter signal in response to reception of the transmitted signals at the communication device, wherein respective arrival times of the transmitted signals are offset from one another as a function of respective positions of the transmitting communication devices;
   a plurality of tapped delay lines each configured to adjust a phase and frequency of the matched filter signal in accordance with weighting coefficients;
   a correlator configured to generate a correlation signal indicative of an amount of correlation among outputs of the plurality of tapped delay lines;
   a peak detector configured to detect peaks of the correlation signal;
   a phase rotator configured to rotate the phase of detected peaks of the correlation signal to account for timing offsets among the respective arrival times of the transmitted signals;
   a combiner configured to coherently combine the detected peaks to form a combined signal, thereby time aligning the transmitted signals to compensate for the respective arrival times of the transmitted signals; and
   a detector configured to detect a presence of the transmitted signals from the combined signal.

29. The communication device of claim 28, wherein in the plurality of tapped delay lines operates as an equalizer.

30. The communication device of claim 28, wherein each of the transmitted signals includes a serial probe comprising a known data sequence, and wherein said communication device determines a channel impulse response from the serial probe and determines the weighting coefficients from the channel impulse response.

31. The communication device of claim 28, said communication device heuristically combines the transmitted signals by phase matching and adding the magnitude of the transmitted signals.

32. The communication device of claim 28, wherein the communication device is a mobile communication device.

33. A network of communication devices, comprising:
   a lead communication device and a plurality of other communication devices sharing a common time reference with the lead communication device, wherein the lead communication device commands the plurality of other communication devices to transmit signals to a receiving device at a fUture time, and wherein the lead communication device and the plurality of other communication devices respectively transmit a plurality of signals at the fUture time using a carrier sense multiple access with collision avoidance (CSMA/CA) protocol, such that the plurality of signals are respectively transmitted over the same communication channel substantially simultaneously, each of the plurality of signals including an information signal which is coherently combinable with corresponding information signals in others of the signals.

34. The network of claim 33, wherein the lead communication device broadcasts a command to the plurality of other communication devices.

35. The network of claim 33, wherein a time between commanding of the plurality of other communication devices and the future time is greater than a longest signal propagation time between the lead communication device and the other communication devices.

36. The network of claim 33, wherein the common time reference is the time of day.

37. The network of claim 33, wherein the lead communication device is a mobile communication device.

38. The network of claim 33, wherein at least one of the plurality of other communication devices is a mobile communication device.

39. The method of claim 1, wherein the transmitting communication devices are in a peer-to-peer network.

40. The method of claim 12, wherein the transmitting communication devices are in a peer-to-peer network.

41. The communication system of claim 18, wherein the transmitting communication devices are in a peer-to-peer network.

* * * * *